(12) United States Patent
Wang He

(10) Patent No.: US 8,821,003 B2
(45) Date of Patent: Sep. 2, 2014

(54) LIGHT GUIDE PLATE HAVING DUAL MICRO STRUCTURES

(75) Inventor: Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/598,631

(22) Filed: Aug. 30, 2012

(65) Prior Publication Data
US 2013/0201724 A1  Aug. 8, 2013

(30) Foreign Application Priority Data
Feb. 2, 2012 (TW) .............................. 101103430 A

(51) Int. Cl.
F21V 7/04 (2006.01)

(52) U.S. Cl.
USPC ............................. 362/628; 362/621; 362/615

(58) Field of Classification Search
USPC ......... 362/600, 602, 606, 608, 611–612, 615, 362/617–622, 628
See application file for complete search history.

(56) References Cited

U.S. PATENT DOCUMENTS

| 7,808,578 B2 * | 10/2010 | Ye ................................. 349/65 |
| 2008/0137373 A1 * | 6/2008 | Li ................................. 362/620 |
| 2010/0238684 A1 * | 9/2010 | Chiu et al. ................... 362/606 |

* cited by examiner

*Primary Examiner* — Donald Raleigh
(74) *Attorney, Agent, or Firm* — Novak Druce Connolly Bove + Quigg LLP

(57) ABSTRACT

A light guide plate includes a light incident surface, a light exit surface; and a bottom surface opposite the light exit surface. The light incident surface includes many first micro structures and many second micro structures. Each second micro structure cover some of the first micro structures.

6 Claims, 3 Drawing Sheets

LIGHT GUIDE PLATE HAVING DUAL MICRO STRUCTURES

BACKGROUND

1. Technical Field

The present disclosure relates to light guide plates, and particularly, to a light guide plate with dual micro structures.

2. Description of Related Art

Many liquid crystal displays have a liquid crystal panel and a backlight module, and the backlight module is disposed behind the liquid crystal panel and provides the surface light source of the liquid crystal panel. According to the position of the light emitting device, the backlight module may be categorized as a direct type backlight module or a side type backlight module. In the side type backlight module, a light guide plate is disposed for guiding a light beam emitted from the light emitting device disposed at one side of the light guide plate, so as to provide the surface light source to the liquid crystal panel.

In the side type backlight module having a plurality of LEDs as the light emitting devices, the LEDs are disposed beside an incident surface in the light guide plate, and the LEDs are arranged on a straight line and are spaced from each other. The LEDs emit a plurality of light beams, wherein the light beams enter the light guide plate through the incident surface of the light guide plate. Because the LEDs have high directivity (i.e., have a limited light emitting angle range), bright regions are formed in the light guide plate within the light emitting angle range and close to the LEDs, and dark regions are formed in the light guide plate outside of the light emitting angle range. The light guide plate may not be able to provide a uniform surface light due to the existence of these bright and dark regions, and this is referred to as the hot spot phenomenon.

Therefore, there is a need to provide a light guide plate to solve the aforementioned problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail with reference to the accompanying drawings.

Figure 1:
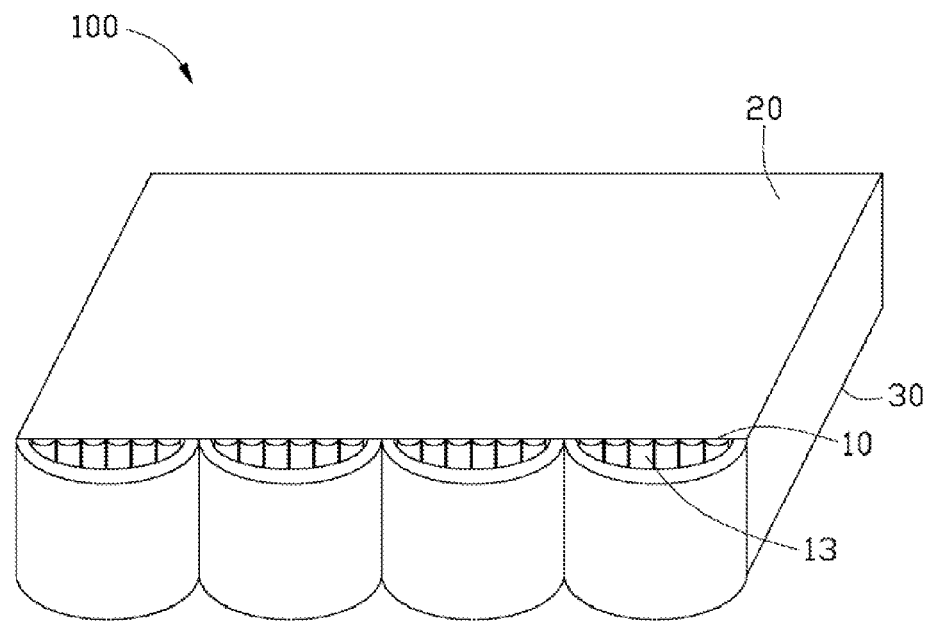
FIG. 1 is an isometric view of a light guide plate in accordance with an embodiment.
Figure 2:
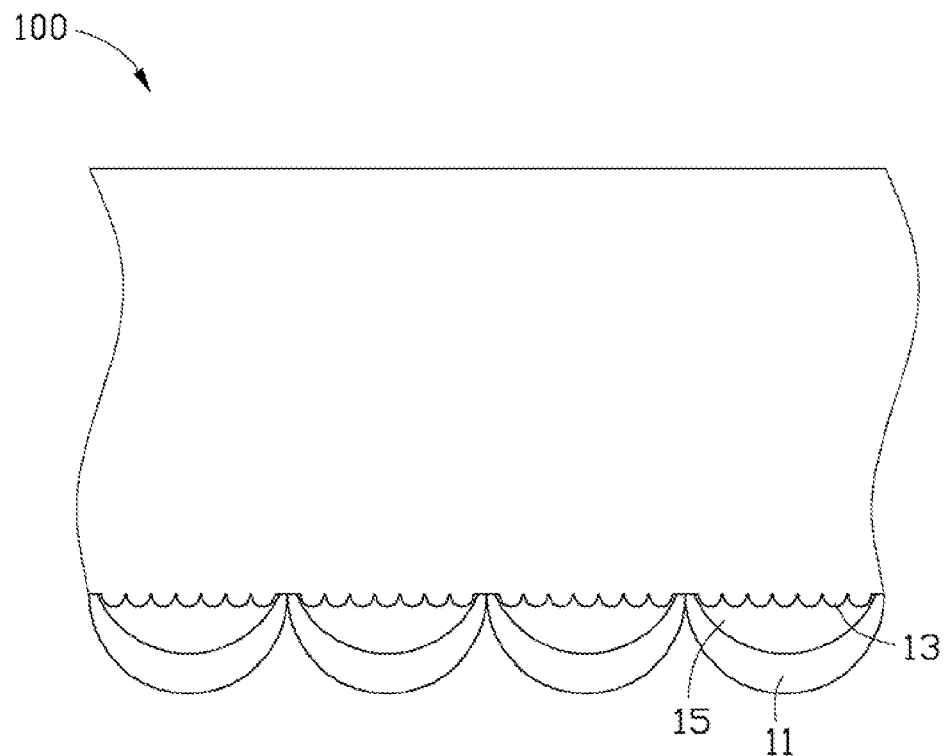
FIG. 2 is a planar view of the light guide plate of FIG. 1.

Referring to FIGS. 1 and 2, a light guide plate 100 for a side type backlight module is disclosed and is used for converting point/line light sources into surface light sources in a uniform light energy distribution. In the embodiment, the light guide plate 100 is a planar, rectangular plate and includes a light incident surface 10, a light exit surface 20, and a bottom surface 300 opposite the light exit surface 20. The light guide plate 100 can be made of acrylic resin, polycarbonate, polyethylene resin, or the like.

As indicated in FIG. 2, a number of first micro structures 13 protrude from the light incident surface 10. A number of arch-shaped, second micro structures 11 are attached to the surface 10 such that each second micro structure 11 covers a number of the first micro structures 13 with a clearance 15 between an internal side of the micro structures 11 and the surfaces of the micro structures 13. The first and the second micro structures 13 and 11 form dual micro structures. After first passing through the second micro structures 11 and then passing through the first micro structures 13, the light beams emitted by light sources (e.g., LEDs) enter into the light guide plate 100 and finally exit from the light exit surface 20.

In the embodiment, each micro structure 13 extends from the light exit surface 20 to the bottom surface 30. Each micro structure 13 has a semi-circle cross section. In an alternative embodiment, some of the micro structures 13 may be recessed in the light incident surface 20.

Figure 3:
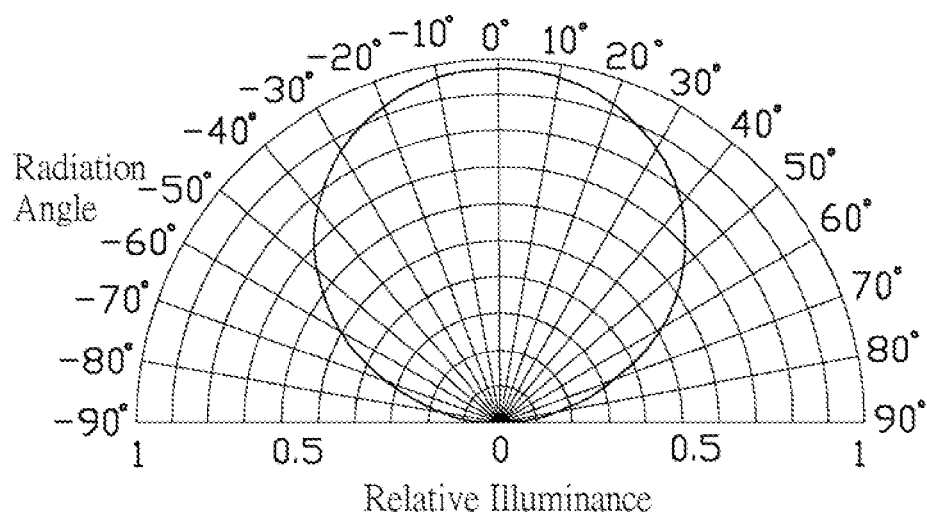
FIG. 3 is a diagram showing a relationship between a radiation angle of an LED and a relative illuminance.

FIG. 3 is a diagram showing a relationship between a radiation angle of an LED and a relative illuminance. As shown in FIG. 3, a radiation angle of zero corresponds to the largest relative illuminance, and as the radiation angle increases, the relative illuminance gradually decreases. After passing through the first micro structures 11 and the second micro structures 13, light beams from the LEDs are refracted twice and the radiation angle of the LEDs are broadened, which reduces the hot spot phenomenon.

While various embodiments have been described and illustrated, the disclosure is not to be construed as being limited thereto. Various modifications can be made to the embodiments by those skilled in the art without departing from the true spirit and scope of the invention as defined by the appended claims.

What is claimed is:

1. A light guide plate comprising:
    a light incident surface;
    a light exit surface; and
    a bottom surface opposite the light exit surface;
    wherein the light incident surface includes a plurality of first micro structures and a plurality of second micro structures, each of the plurality of second micro structures covering some of the plurality of first micro structures; wherein each of the plurality of second micro structures extends from the light exit surface to the bottom surface and includes an arc-shaped cross section;
    wherein a clearance is formed between each of the plurality of second micro structures and the light incident surface, and a portion of the plurality of first micro structures are located in the clearance.

2. The light guide plate according to claim 1, wherein the guide palate plate is a planar sheet.

3. The light guide plate according to claim 1, wherein the guide palate plate is made of acrylic resin, polycarbonate, or polyethylene resin.

4. A light guide plate comprising:
    a light incident surface;
    a light exit surface; and
    a bottom surface opposite the light exit surface;
    wherein the light incident surface includes a plurality of first micro structures and a plurality of second micro structures, the first micro structures and the second micro structures are configured in such a way that allows light to first pass through the second micro structures and then pass through the first micro structures, each of the plurality of second micro structures extends from the light exit surface to the bottom surface and includes an arc-shaped cross section.

5. The light guide plate according to claim 4, wherein each of the plurality of first micro structures extends from the light exit surface to the bottom surface and protrudes from the light incident surface.

6. The light guide plate according to claim 4, wherein a clearance is formed between each of the plurality of second micro structures and the light incident surface, and a portion of the plurality of first micro structures are located in the clearance.

* * * * *